(12) United States Patent
Kojima et al.

(10) Patent No.: US 7,684,921 B2
(45) Date of Patent: Mar. 23, 2010

(54) VEHICLE RUNNING CONTROL APPARATUS AND MAP INFORMATION DATA RECORDING MEDIUM

(75) Inventors: Takao Kojima, Tokyo (JP); Tokuji Yoshikawa, Tokyo (JP); Kazuhiko Satou, Tokyo (JP); Satoru Kuragaki, Tokyo (JP); Shiho Izumi, Tokyo (JP); Toshimichi Minowa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/845,137

(22) Filed: May 14, 2004

(65) Prior Publication Data

US 2005/0004743 A1    Jan. 6, 2005

Related U.S. Application Data

(63) Continuation of application No. 10/084,472, filed on Feb. 28, 2002, now Pat. No. 6,738,705.

(30) Foreign Application Priority Data

Dec. 7, 2001   (JP) ............................. 2001-374699

(51) Int. Cl.
    *G05D 1/00*    (2006.01)
(52) U.S. Cl. .................... 701/96; 340/435; 340/903; 180/170; 180/167; 342/104; 342/118; 342/147
(58) Field of Classification Search ............... 701/96, 701/200, 205, 301, 300, 25, 93; 342/29, 342/104, 109, 118, 147; 340/902, 903, 435, 340/436, 444, 425.5, 437, 466, 937, 465; 180/170, 282, 167; 348/116, 148; 73/178 R; *G05D 1/00*
See application file for complete search history.

(56) References Cited

U.S. PATENT DOCUMENTS

| | | | | |
|---|---|---|---|---|
| 4,847,772 A | * | 7/1989 | Michalopoulos et al. | 701/117 |
| 4,926,346 A | * | 5/1990 | Yokoyama | 701/28 |
| 5,304,980 A | * | 4/1994 | Maekawa | 340/435 |
| 5,901,806 A | * | 5/1999 | Takahashi | 180/170 |
| 6,032,098 A | * | 2/2000 | Takahashi et al. | 701/210 |
| 6,094,616 A | * | 7/2000 | Andreas et al. | 701/96 |
| 6,161,072 A | | 12/2000 | Clapper et al. | |
| 6,204,755 B1 | * | 3/2001 | Kikuchi | 340/435 |
| 6,327,536 B1 | * | 12/2001 | Tsuji et al. | 701/301 |

(Continued)

FOREIGN PATENT DOCUMENTS

DE    195 06 364 A1    8/1995

(Continued)

*Primary Examiner*—Tuan C To
(74) *Attorney, Agent, or Firm*—Crowell & Moring LLP

(57) ABSTRACT

The present invention can realize a vehicle running control apparatus including ACC function and map information data recording medium to obtain effective information for safety driving capable for running control meeting a driver's feeling. The first running speed is decided on the basis of the distance between the vehicles and the relative speed. The position detecting means detects the position of own vehicle on a map. The map information getting means gets road information, the width of the road, the radius of curvature, and slope on the basis of the map information. The visible distance estimating means estimates the visible distance on the basis of the map information, deciding the second running safety speed with the estimated visible distance. The running control means decides the object running speed of smallest one of the set speed, the first running speed, and the second running speed.

5 Claims, 16 Drawing Sheets

U.S. PATENT DOCUMENTS

| | | | |
|---|---|---|---|
| 6,498,620 B2 * | 12/2002 | Schofield et al. | 348/148 |
| 6,535,814 B2 * | 3/2003 | Huertgen et al. | 701/210 |
| 6,853,906 B1 * | 2/2005 | Michi et al. | 701/207 |
| 7,617,037 B2 * | 11/2009 | Desens et al. | 701/96 |
| 2001/0016797 A1 * | 8/2001 | Ogura et al. | 701/301 |
| 2002/0011924 A1 * | 1/2002 | Schwartz et al. | 340/425.5 |

FOREIGN PATENT DOCUMENTS

| | | |
|---|---|---|
| DE | 196 38 511 A1 | 3/1998 |
| DE | 298 20 659 U1 | 4/1999 |
| DE | 100 04 525 A1 | 8/2001 |
| EP | 1 115 010 A | 7/2001 |
| GB | 2 334 700 A | 9/1999 |
| JP | 7-27541 | 1/1995 |
| JP | 10-166899 | 6/1998 |
| JP | 11-023684 | 1/1999 |

* cited by examiner

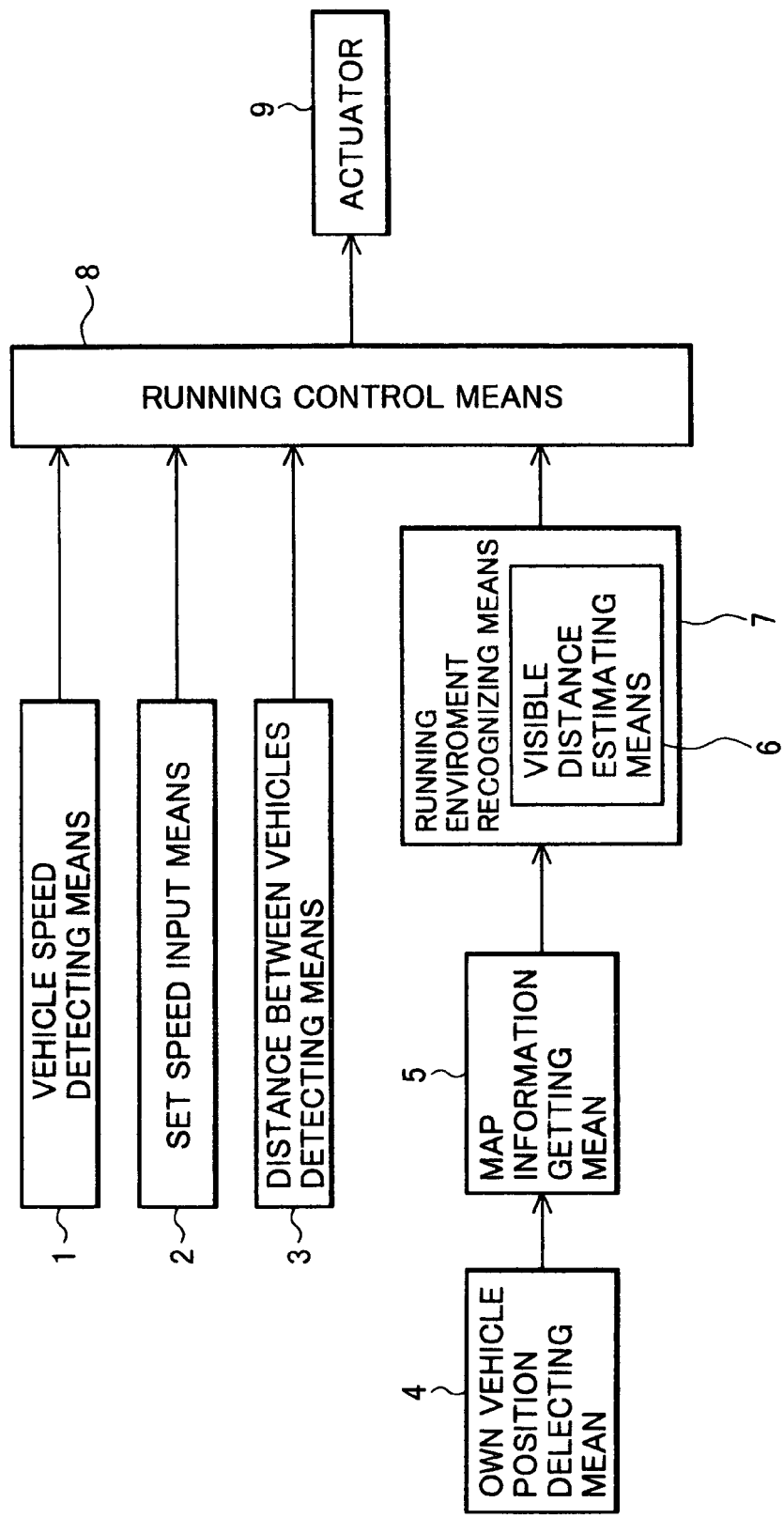

AREA E
AREA F
AREA D
AREA C

AREA G
WATCHING POINT Pc
AREA H
VIEW POINT OF DRIVER Pc

VEHICLE RUNNING CONTROL APPARATUS AND MAP INFORMATION DATA RECORDING MEDIUM

This application is a continuation of application Ser. No. 10/084,472, filed Feb. 28, 2002.

BACKGROUND OF THE INVENTION

The present invention relates to a vehicle running control apparatus and map information data recording medium, such as a Cruise Control apparatus, Adaptive Cruise Control (described ACC hereinafter) apparatus or the like.

The ACC apparatus is well known. The ACC apparatus includes a function for keeping the distance between one's own vehicle and preceding vehicles running in front of the one's own vehicle.

Techniques relating the ACC apparatus is disclosed in, for example, JP-A-10-166899 as a running control apparatus. In the running control apparatus, the ACC apparatus includes normal control function and deciding means for deciding at least one object value of the distance between vehicles and running speed in response to the output from an estimating means for estimating running road environment recognizing characteristics for a driver.

Further, the running road environment recognizing characteristics estimating means detects the image of the front road surface by using a camera. The estimating means estimates the running road environment recognizing characteristics on the basis of the number of edges in the detected road image or the ratio the areas of whole image to the area of specific color or brightness. The number of the edges represents structures or vehicle parking on the road.

Further, other means for estimating running road environment recognizing characteristics estimates the environment on the basis of the wide of the road, attributes of road (national high way, automobile road, automobile expressway or the like), the number of brunches or the like, which are obtained from a car navigation system, traffic infrastructure or the image of the front road.

Furthermore, other means for estimating running road environment recognizing characteristics estimates the road environment on the basis of the standard deviation of the accelerator divergence within a predetermined time range before the start of constant speed running control.

As described above, the vehicle running control apparatus analyzes the uneasiness environment for a driver by using a running environment recognizing apparatus, compensating the object distance between one's own vehicle and preceding vehicle and the a vehicle speed set by the driver. Accordingly, the vehicle running control apparatus can control the vehicle running suitable for the road environment, so that a driver uses the constant speed running control apparatus with peace of mind and with no sense of incompatibly of auto speed control in case of no receding vehicle.

SUMMARY OF THE INVENTION

According to the above-mentioned prior art, the distance between the vehicles or set vehicle speed is compensated on the basis of the running road environment recognizing characteristics estimated from visible of the road against the structures or vehicle parking at beside the road. The position of one's own vehicle in the running road, however, is not considered in the above-mentioned prior art.

Therefore, the running control speed may not meet the sense of the vehicle driver. For example, the vehicle speed set to predetermined speed for driver's safety may be compensated in order to meet the actual road environment.

Further, a vehicle speed can be controlled in a straight road on the basis of the running road environment recognizing characteristics because the running road environment recognizing characteristics is calculated on the basis of the navigation information of wide of the road, attribute of road, and the number of brunches. A vehicle speed, however, may not be controlled at a bad visible section, such as, curved road, the ascending slope near a summit, or the entrance of the descending slope, because other road structure information or running environment information are not used, so that the vehicle speed do not meet the sense of a driver.

An object of the present invention is to realize a vehicle running control apparatus including ACC function and map information data recording medium to obtain effective information for safety driving capable for running control meeting a driver's feeling.

To achieve the above object, the present invention is constituted as follows.

In a vehicle running control apparatus automatically controlling running of a vehicle without driver's operation, the vehicle running control apparatus comprises a set speed input means for inputting a set speed; an origination vehicle position detecting means for detecting a position of the origination vehicle; a map information getting means for getting map information including road attributes information and road structure information on the basis of an output from the origination vehicle position detecting means; a running environment recognizing means for recognizing a running environment, including a visible distance estimating means for estimating a visible distance of a driver on a road on the basis of the map information get by the map information getting means; and a vehicle running control means for deciding an object running speed of the origination vehicle in accordance with the visible distance estimated by the running environment recognizing means, for controlling running of the origination vehicle to keep the object running speed.

In a vehicle running control apparatus automatically controlling running of a vehicle without driver's operation, the vehicle running control apparatus comprises a set speed input means for inputting a set speed; an origination vehicle position detecting means for detecting a position of the origination vehicle; a map information getting means for getting map information including road attributes information and road structure information on the basis of an output from the origination vehicle position detecting means; a running environment recognizing means for recognizing a running environment, including a visible distance estimating means for estimating a visible distance of a driver on a road on the basis of at least one of road attribute, a width of a road, a radius of curvature, and a slope of descending or ascending road in the map information get by the map information getting means; and a vehicle running control means for computing a first running speed in accordance with the visible distance estimated by the running environment recognizing means, comparing the first running speed with the set speed set by the set speed input means, deciding an object running speed of the origination vehicle on the basis of at least one of the first running speed and the set speed when the set speed is higher than the first running speed, controlling running of the origination vehicle to keep the object running speed.

Also preferably, in the vehicle running control apparatus, the apparatus further comprises a storing means for storing vehicle attribute information of the origination vehicle, wherein the running environment recognizing means corrects the visible distance on the basis of the vehicle attribute information stored in the storing means.

Also preferably, in the vehicle running control apparatus, the origination vehicle position detecting means detects origination vehicle running lane position information, the map information getting means getting a width of road side area information and a number of lanes of a road information, the running environment recognizing means estimating a visible distance on the basis of at least one information of the origination vehicle running lane position information, the width of road side area information and the number of lanes of a road information.

Also preferably, in the vehicle running control apparatus, the map information getting means gets presence of a side wall of a road information and a height of the wall information, the running environment recognizing means estimating a visible distance on the basis of at least one information of the presence of a side wall of a road information and a height of the wall information.

Also preferably, in the vehicle running control apparatus further comprises a space detecting means for detecting the origination vehicle vicinity space information, wherein the running environment recognizing means including a visible distance detecting means for detecting a visible distance, which can be seen by a driver, on the basis of the space information detected by the space detecting means, and an output selecting means for selecting one of outputs from the visible distance estimating means and the visible distance detecting means on the basis of the origination vehicle position detected by the origination vehicle position detecting means.

Also preferably, in the vehicle running control apparatus, the space detecting means gets an origination vehicle vicinity condition which can be recognized by a driver, dividing the origination vehicle vicinity condition into a dangerous area and a safety area.

Also preferably, in the vehicle running control apparatus further comprises an origination vehicle position abnormal detecting means for detecting an abnormal condition of an output from the origination vehicle position detecting means, wherein all or part of functions of the running control apparatus is stopped when the origination vehicle position abnormal detecting means detects an abnormal condition of the origination vehicle position.

Also preferably, in the vehicle running control apparatus, the abnormal condition of the origination vehicle position is reported to a driver when the origination vehicle position abnormal detecting means detects an abnormal condition of the origination vehicle position and all or part of functions of the running control apparatus is stopped.

In a vehicle running control apparatus automatically controlling running of a vehicle without driver's operation, the vehicle running control apparatus comprises a set speed input means for inputting a set speed; an origination vehicle position detecting means for detecting a position of the origination vehicle; a map information getting means for getting map information including road attributes information and road structure information on the basis of an output from the origination vehicle position detecting means; a vehicle running control means for deciding an object running speed of the origination vehicle on the basis of the origination vehicle position detected by the origination vehicle position detecting means and the map information get by the map information getting means, controlling running of the origination vehicle to keep the object running speed; and an origination vehicle position abnormal detecting means for detecting an abnormal condition of an output from the origination vehicle position detecting means, wherein all or part of functions of the running control apparatus is stopped when the origination vehicle position abnormal detecting means detects an abnormal condition of the origination vehicle position.

Preferably, in the vehicle running control apparatus, the abnormal condition of the origination vehicle position is reported to a driver when the origination vehicle position abnormal detecting means detects an abnormal condition of the origination vehicle position and all or part of functions of the running control apparatus is stopped.

In a map information data storing medium storing at least road structure information and road attribute information, the a map information data storing medium comprises at least one information of presence of a side wall of a road information, a height of the wall information, and a width of road side band area information.

Preferably, the map information data storing medium further comprises a radius of curvature information, a width of a road information, and a slope of descending or ascending road information.

In a vehicle running control system including a vehicle running control apparatus automatically controlling running of a vehicle without driver's operation, and a vehicle driving apparatus controlled by the vehicle running control apparatus, the vehicle running control apparatus comprises a set speed input means for inputting a set speed; an origination vehicle position detecting means for detecting a position of the origination vehicle; a map information getting means for getting map information including road attributes information and road structure information on the basis of an output from the origination vehicle position detecting means; a running environment recognizing means for recognizing a running environment, including a visible distance estimating means for estimating a visible distance of a driver on a road on the basis of at least one of road attribute, a width of a road, a radius of curvature, and a slope of descending or ascending road in the map information get by the map information getting means; and a vehicle running control means for computing a first running speed in accordance with the visible distance estimated by the running environment recognizing means, comparing the first running speed with the set speed set by the set speed input means, deciding an object running speed of the origination vehicle on the basis of at least one of the first running speed and the set speed when the set speed is higher than the first running speed, controlling running of the origination vehicle to keep the object running speed, and the vehicle driving apparatus is controlled in accordance with a control command from the vehicle running control apparatus to control a speed of the vehicle.

In an automobile including a vehicle running control apparatus automatically controlling running of an automobile without driver's operation, and a automobile driving apparatus controlled by the automobile running control apparatus, the automobile running control apparatus comprises a set speed input means for inputting a set speed; an origination automobile position detecting means for detecting a position of the origination automobile; a map information getting means for getting map information including road attributes information and road structure information on the basis of an output from the origination automobile position detecting means; a running environment recognizing means for recognizing a running environment, including a visible distance estimating means for estimating a visible distance of a driver on a road on the basis of at least one of road attribute, a width of a road, a radius of curvature, and a slope of descending or ascending road in the map information get by the map information getting means; and a automobile running control means for computing a first running speed in accordance with the visible distance estimated by the running environment recognizing means, comparing the first running speed with the set speed set by the set speed input means, deciding an object running speed of the origination automobile on the basis of at least one of the first running speed and the set speed when the set speed is higher than the first running speed, controlling running of the origination automobile to keep the object running speed, and the automobile driving apparatus is controlled in accordance with a control command from the automobile running control apparatus to control a speed of the automobile.

The road construction information includes at least the width of a road, radius of curvature, slope, the presence of side wall of a road, and the height of the wall information.

BRIEF DESCRIPTION OF THE DRAWINGS

FIG. 1 is a schematic diagram of a vehicle running control apparatus according to the first embodiment of the present invention.

DETAILED DESCRIPTION OF THE PREFERRED EMBODIMENTS

Figure 2D:
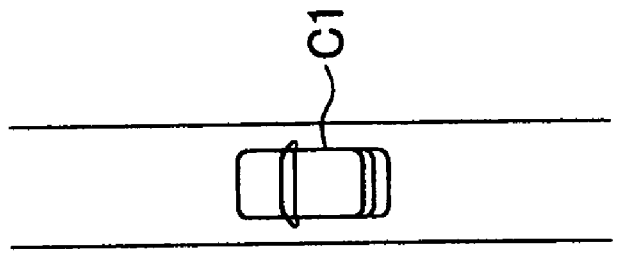
FIGS. 2A to 2D are illustrations for explaining the basic function and operation of a vehicle running control means according to the present invention.

Hereinafter, embodiment of the present invention will be described below with reference to the drawings.

Firstly, the construction of a vehicle running control apparatus according to the first embodiment of the present invention will be described with reference to FIG. 1.

In FIG. 1, reference numeral 1 represents a vehicle speed detecting means detecting the speed of one's own vehicle (origination vehicle), reference numeral 2 representing a set speed input means inputting a speed desired by a driver, reference numeral 3 representing vehicle distance detecting means for detecting distance between one's own vehicle and a preceding vehicle, reference numeral 4 representing a position detecting means for detecting the position of one's own vehicle.

Further, reference numeral 5 represents a map information getting means for getting information including road attribute information and road construction information, reference numeral 6 representing a visible distance estimating means for estimating distance (referred to simplify as "visible distance" hereinafter) which can be viewed through the position of one's own vehicle on the basis of the output from the map information getting means 5, reference numeral 7 representing a running environment recognizing means for recognizing a running environment on the basis of the output from the visible distance estimating means 6. The running environment recognizing means 7 includes the visible distance estimating means 6.

Further, reference numeral 8 represents a vehicle running control means, the vehicle running control means 8 controlling a vehicle speed on the basis of the outputs from the vehicle speed detecting means 1, the set speed input means 2, the vehicle distance detecting means 3, the map information getting means 5, and the running environment recognizing means 7.

Further, reference numeral 9 represents an actuator for controlling the speed of a vehicle on the basis of the output from the vehicle running control means 8.

The position detecting means 4 uses a artificial satellite, such as a GPS (Global Positioning System), a communication between traffic infrastructure and one's own vehicle or the like.

The map information getting means 5 may include a map information data base. Other suitable storage means may store map information. The medium for storing the map information is CD-ROM, DVD, hard disc or the like read by a computer. A map information data may be installed in a vehicle as a data base stored in a recording medium. Alternatively, a map information data may be obtained from a information center by a suitable communication means or method.

When the position detecting means 4 detects the own vehicle position information, the map information getting means 5 gets the map information corresponding to the own vehicle position information. The own vehicle position information and map information are inputted to the running environment recognizing means 7, the running environment information recognized by the means 7 being inputted to the running control means 8.

A car navigation system can be used as the combination of the position detecting means 4 and the map information getting means 5, for example. The car navigation system reports a route to an object location to a crew-member.

The running control means 8, for example, includes a CPU or the like installed in a vehicle. The running environment recognizing means 7, for example, includes a CPU installed in a vehicle. The same CPU can execute the functions of the running control means 8 and the running environment recognizing means 7. Since the running environment recognizing means 7 includes the visible distance estimating means 6, the CPU executes the functions of the visible distance estimating means 6 also.

The actuator 9 controls an actuator such as an automatic transmission, brakes, or throttle in order to control the speed of a vehicle. In this specification, the actuator 9 represents a actuator operating an automatic transmission, brakes, or throttle.

Next, the basic function and operation of the running control means 8 will be described hereinafter with reference to FIGS. 2A to 2D.

Figure 2C:
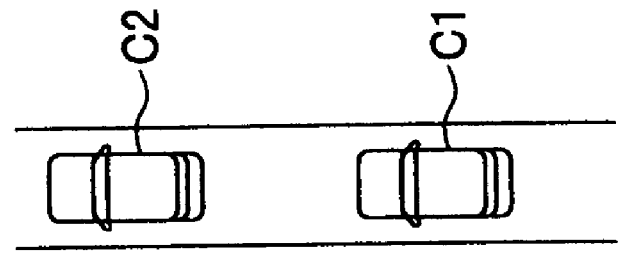
Figure 2B:
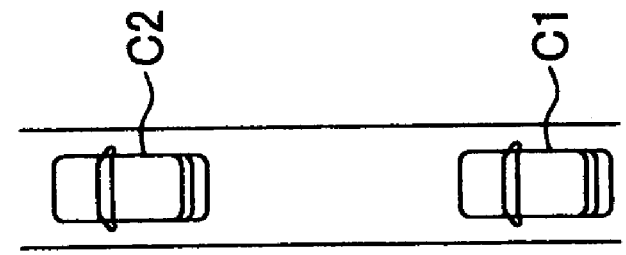
Figure 2A:
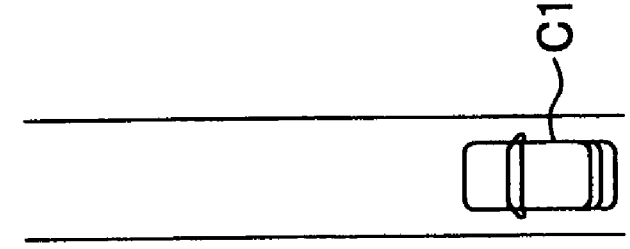

As shown in FIG. 2A, the running control means 8 controls the actuator 9 to run the vehicle at the speed detected by the detecting means 1 to the speed (100 km/h for example) set by a driver through the speed input means 2, when no vehicle exists in front of course of own vehicle C1.

As shown in FIG. 2B, the running control means 8 controls the actuator 9 to reduce the speed of own vehicle C1 in accordance with the speed (80 km/h for example) of the preceding vehicle C2 on the basis of the output from the vehicle distance detecting means 3, when a preceding vehicle C2 exists in front of course of own vehicle C1. As shown in FIG. 2C, own vehicle C1 follows the preceding vehicle C2 with suitable distance between own vehicle C1 and the preceding vehicle C2.

When the preceding vehicle is out of course of own vehicle C1, the running control means 8 controls the actuator 9 to run the vehicle at the speed (100 km/h for example) set by a driver.

The above-mentioned function and operation are vehicle control as same as prior art. The vehicle running control apparatus according to the first embodiment of the present invention executes the following control with above-mentioned functions of ordinary ACC apparatus.

Namely, the map information from the map information getting means 5 is inputted to the running environment recognizing means 7, the running environment recognizing means 7 supplying the computed degree of visibility of own vehicle front view. The computed degree of visibility coincides with the actual driver's recognition. The map information from the getting means 5 includes radius curvature effecting the running of vehicle, existence of side wall, height of the side wall, width of roadside band, slope angle of descend or ascend road or the like. The vehicle running control means 8 controls the vehicle speed in accordance with the own vehicle running environment. For example, The vehicle running control means 8 reduces the vehicle speed at a bad visibility road.

Therefore, the first embodiment of the present invention can realize the vehicle running control apparatus capable for judging the visibility of a driver's recognition (visible distance) and for reducing the speed at bad visibility road, so that the running of the vehicle can be controlled with comfortable condition corresponding to the driver's feeling.

Next, the visible distance will be described with reference to FIG. 3.

Figure 3:
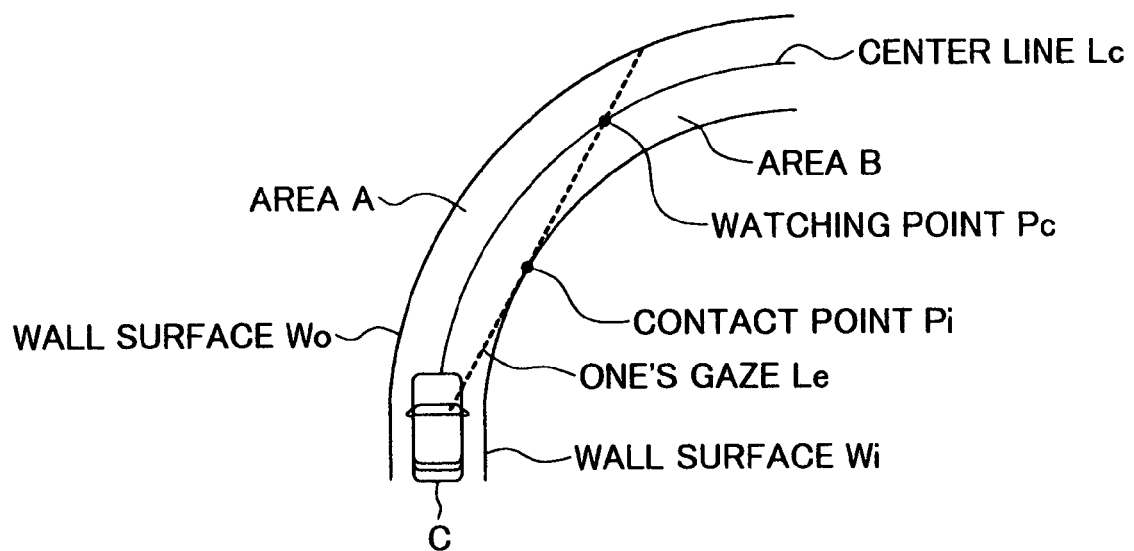
FIG. 3 is an illustration for explaining a visible distance in the first embodiment of the present invention.

FIG. 3 is a plane view of a curved road including side wall and a vehicle on the road. Reference C represents own vehicle, references Wo and Wi representing out side wall (outer peripheral side wall) and inside wall (inner peripheral side wall having a radius of curvature smaller that that of the outer peripheral side wall), reference Le representing the recognition limit line of a driver in this running environment, reference Lc representing the center line (not center of the road) of the running own vehicle C width.

The area A is the area including the recognition limit line Le and outer peripheral side wall Wo. A driver can easily recognize the front condition in the area A. The area B is the area including the recognition limit line Le and inner peripheral side wall Wi. A driver cannot easily recognize the front condition in the area B which is a dead area.

In the running condition (environment) shown in FIG. 3, the gaze line of the driver is the recognition limit line Le contacting the point Pi of the inner wall Wi and passing to own vehicle C. The cross point of the recognition limit line Le and the center line Lc is a point Pc (hereinafter watching point) watched by the driver.

In this specification, the visible distance is defined as the distance to the watching point Pc from own vehicle C.

Next, the change of the visible distance induced by difference running environment will be described with reference to FIGS. 4, 5, 6A and 6B.

Figure 4:
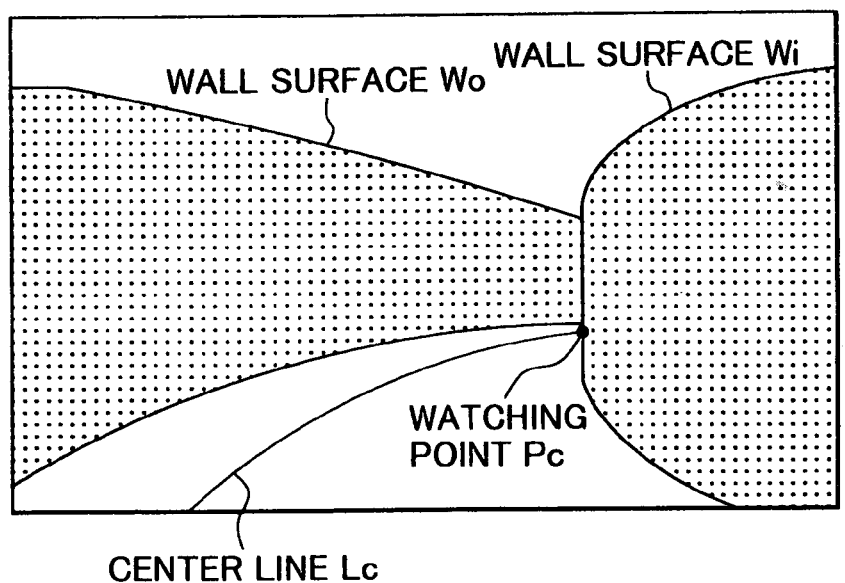
FIG. 4 shows a running environment of a curved road having small radius of curvature and high wall recognized from driver's view point.
Figure 5:
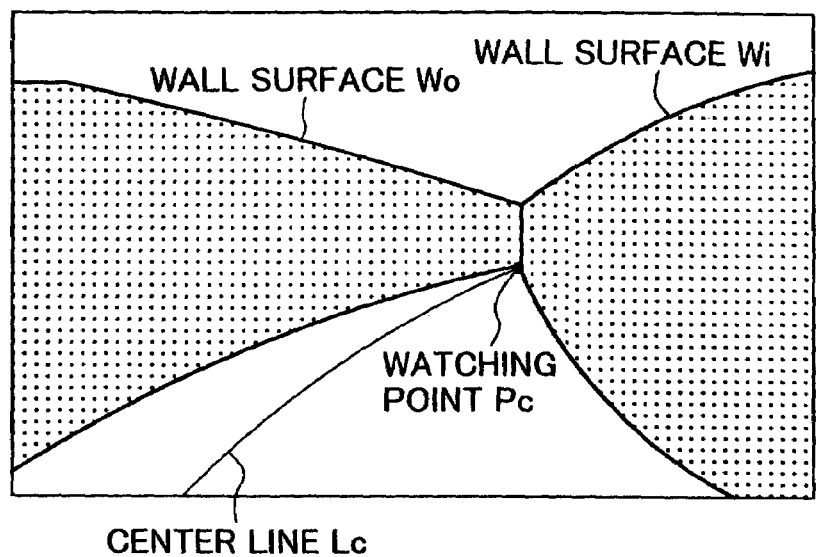
FIG. 5 shows a running environment of a curved road having large radius of curvature and high wall recognized from a driver's view point.

FIGS. 4 and 5 are drawings showing the angular of the view watched from the view point of a driver in the curved road including high side wall. In FIG. 4, the radius curvature of the curved road is small. In FIG. 5, the radius curvature of the curved road is larger that that of the curved road shown in FIG. 4.

As shown in FIG. 4, in case of small radius curvature road, the front view cannot easily recognized because the watching point Pc is near to own vehicle in comparison with the case of the road shown in FIG. 5. Therefore, the driver desires low running speed.

As shown in FIG. 5, in case of large radius curvature road, the front view can easily recognized because the watching point Pc is far from own vehicle. Therefore, the driver desires high running speed in comparison with the case of the road shown in FIG. 4.

Figure 6A:
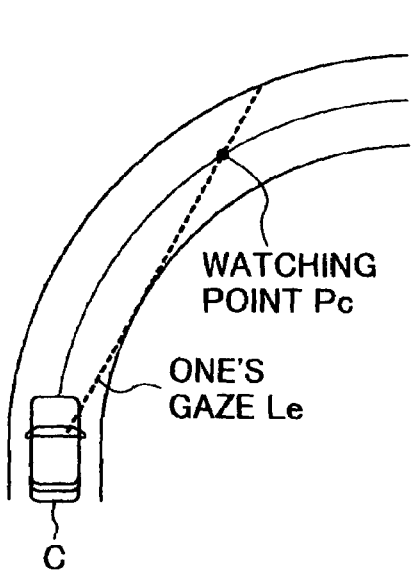
FIGS. 6A and 6B show the difference between the visible distances of width and narrow roads.
Figure 6B:
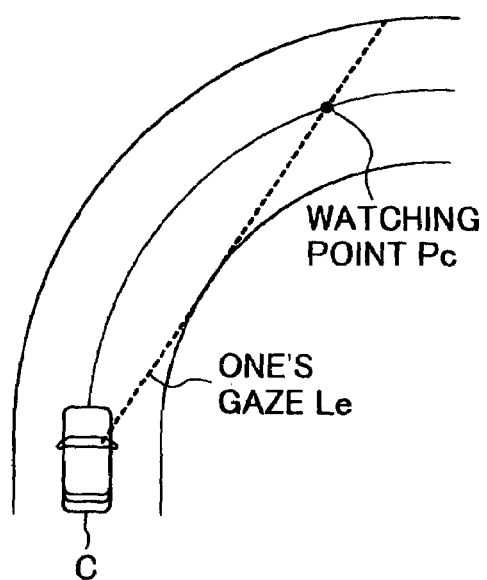

As shown in FIGS. 6A and 6B, the running position of the vehicle in width direction of one road having small width is different from that of the vehicle in width direction of other road having large width and the radius curvature which is same radius curvature of the one road. Namely, the distance between own vehicle and the inner side wall of the road having large width can be made to large in comparison with the road having small width.

Therefore, the watching point Pc at large width road shown in FIG. 6B is far from own vehicle in comparison with the watching point Pc at small width road shown in FIG. 6A. The running speed desired by a driver in condition shown in FIG. 6B is higher than the running speed desired by a driver in condition shown in FIG. 6A because the visible distance shown in FIG. 6B is longer than the visible distance shown in FIG. 6A.

In the first embodiment of the present invention, the running speed is decided by judging the running environment on the basis of the above-mentioned visible distance, so that the vehicle running control apparatus can control the speed of the vehicle suitable for a driver's driving feeling.

One example of computing process will be described with reference to FIGS. 7 and 8. The computing process decides a running vehicle speed suitable for the above-mentioned running environment (condition).

Figure 7:
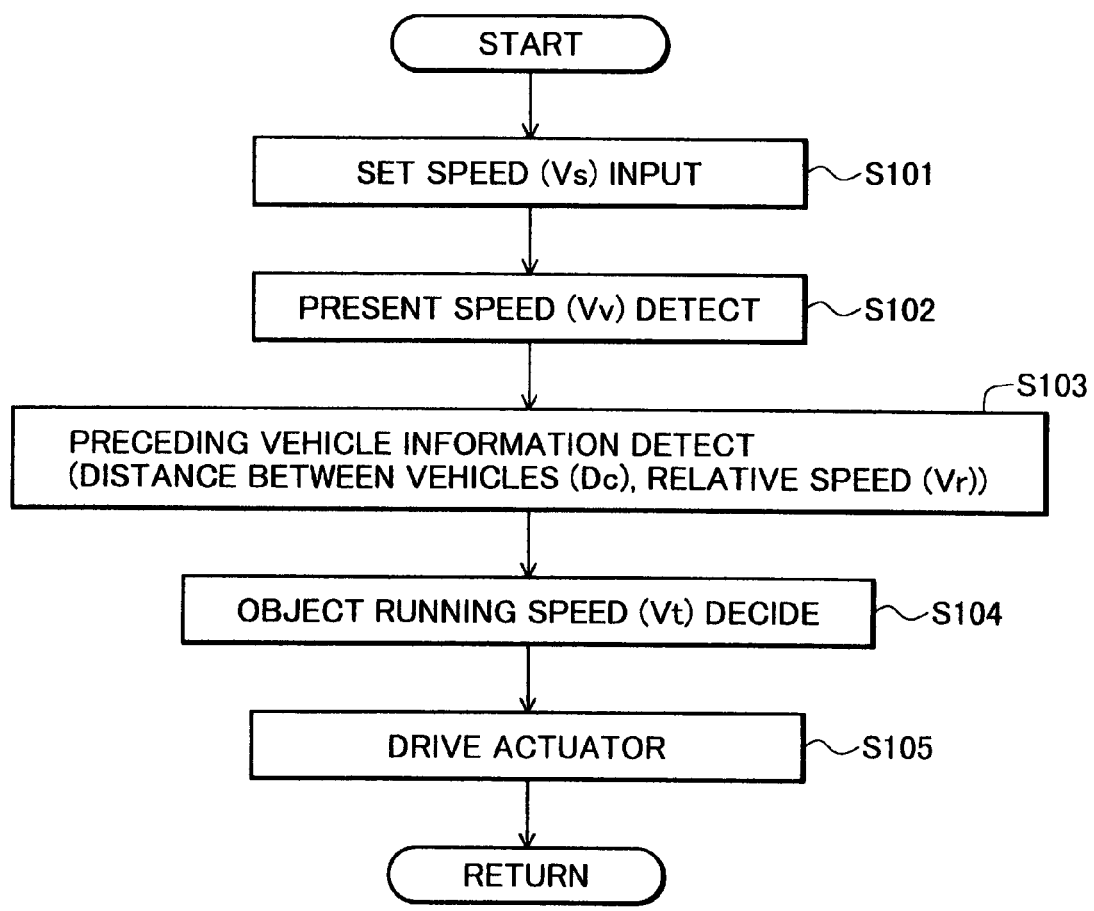
FIG. 7 is a flowchart of whole computing process according to the first embodiment of the present invention.

FIG. 7 is a flowchart showing process operation of the vehicle running control apparatus with suitable operation to running conditions, according to the first embodiment of the present invention. In FIG. 7, the processes are nearly equal to the process of prior art, except for "object running speed (Vt) decide" step S104. FIG. 8 a flowchart showing the process of "object running speed (Vt) decide" step S104 shown in FIG. 7.

In FIG. 7, a driver inputs the desired running speed (referred as "set speed (Vs)" hereinafter) at the step S101. Next, the present speed (Vv) of own vehicle is detected by the vehicle speed detecting means 1 at the step S102. At the step S103, the distance (Dc) between the vehicles and the relative speed (Vr) are measured as the preceding vehicle information by the vehicle speed detecting means 1.

The object running speed (Vt) is decided at the step S104. The actuators of the transmission, brake, and throttle are operated to make the vehicle running speed to be the object running speed (Vt) at the step S105.

Next, the contents of the deciding process of object running speed (Vt) at the step S104 will be described with reference to FIG. 8.

Figure 8:
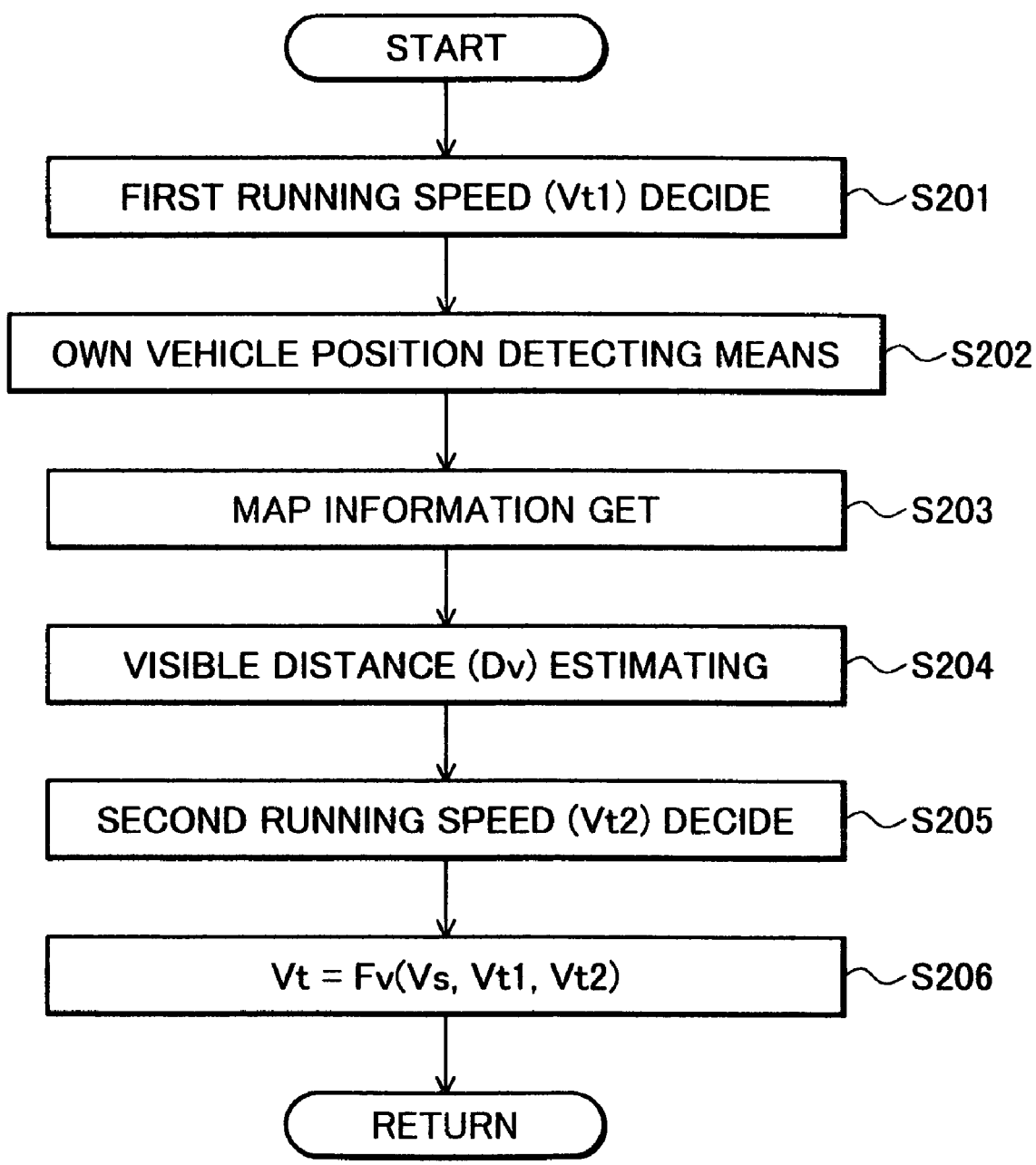
FIG. 8 is a flowchart of one part of computing process according to the first embodiment of the present invention.

In FIG. 8, own vehicle running speed (referred as "the first running speed (Vt1)" hereinafter) is decided at the step S201 on the basis of the distance (Dc) and the relative speed (Vr) detected at the step S103 in FIG. 7.

Next, the position detecting means 4 detects the position of own vehicle on a map at the step S202 by using a GPS or the like.

Subsequently, the map information getting means 5 gets attribute information (Ra) of road (national high way, automobile road, automobile expressway or the like) of own vehicle running road, the width of the road (Rw), the radius of curvature (referred as "radius of curve (Rr)" hereinafter), and slope (Rs) (referred as "slope (Rs)" hereinafter) of incline or decline road at the step S203 on the basis of the own vehicle position and the map information.

The functions or operations of the steps S204 and S205 are novel functions or operations of the first embodiment according to the present invention. In the step S204, the visible distance (Dv) is estimated on the basis of the map information get at the step S203. In the step S205, the recognizing means 7 decides the safety driving speed (referred as "the second running speed (Vt2)" hereinafter) for the driver at the estimated visible distance (Dv).

The upper limit of the second running speed (Vt2) is the safety running speed (Vt12) at a curved road. The safety running speed (Vt12) can be computed by using the following equation (1), for example. The upper limit speed (Vt12) is set as the second running speed (Vt2), when the computed running speed based on the visible distance (Dv) exceeds the upper limit speed (Vt12).

$$Vt12=\sqrt{(a \cdot Rr)} \tag{1}$$

In the equation (1), reference a is an acceleration in the right or left direction relative to the vehicle running direction. The vehicle can run on a curved road with safety if the acceleration in the right or left direction is lower than the value of reference a at a curved road.

Subsequently, the object running speed (Vt) is decided by using the function Fv (Vs, Vt1, Vt2) on the basis of the above-mentioned set speed (Vs), the first running speed (Vt1), and the second running speed (Vt2).

One example of the function Fv is a following equation (2) computing the minimum value of the set speed (Vs), the first running speed (Vt1), and the second running speed (Vt).

$$Vt=\mathrm{Min}(Vs, Vt1, Vt2) \tag{2}$$

Next, a deciding method for deciding the visible distance (Dv) and the second running speed (Vt2) will be described with reference to FIGS. 9 to 12. The data shown in FIGS. 9 to 12 and the Table 1 is stored in a suitable data storing means as a data map.

Figure 9:
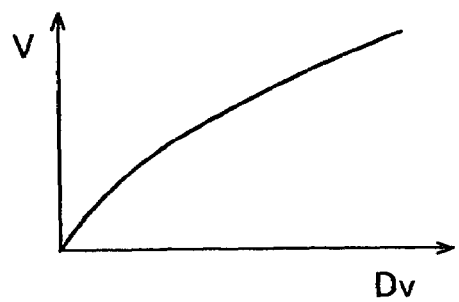
FIG. 9 shows a characteristics of the relationship between a visible distance and running speed.
Figure 10:
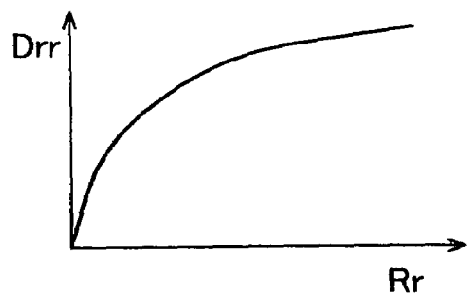
FIG. 10 shows a characteristics of the relationship between a visible distance and radius of curvature.

In FIG. 9, the vertical axis represents speeds, the horizontal axis representing visible distances. FIG. 9 shows the second running speed (Vt2) corresponding to the visible distance (Dv). In FIG. 10, the vertical axis represents visible distance (referred as "curved road visible distance (Drr) hereinafter", the horizontal axis representing the radius of curvature (Rr).

Figure 11:
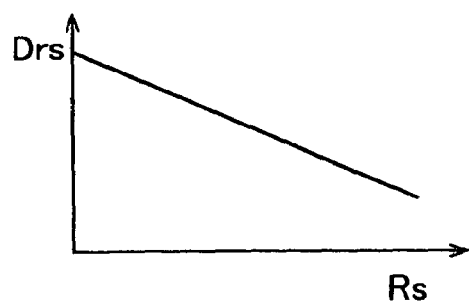
FIG. 11 shows a characteristics of the relationship between a visible distance and grade of road.
Figure 12:
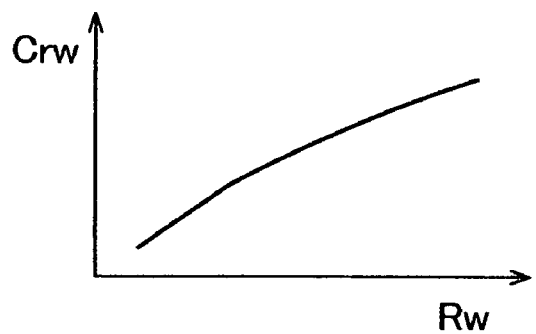
FIG. 12 shows a characteristics of the relationship between a width of a road and a compensate value of a visible distance.

In FIG. 11, the vertical axis represents visible distance (referred as "slope road visible distance (Drs) hereinafter", the horizontal axis representing the degree of slope (Rs). In FIG. 12, the vertical axis represents correction values (Crw) of the visible distance, the horizontal axis representing the width of the road.

Table 1 is a characteristics table showing the correction values (Cra1, ..., Cra5) of the visible distances corresponding to the road attribute information (Ra). The correction values correspond to the visible of the front of the running road. The visible is changed by attributes of road (national high way, automobile road, automobile expressway or the like).

TABLE 1

| Road attribute (Re) | Visible (Era) |
| --- | --- |
| Automobile expressway | Cra1 (high) |
| Automobile road | Cra2 |
| National high way | Cra3 |
| Metropolis and Districts road | Cra4 |
| Cities, towns and Villages road | Cra5 (low) |

The radius of curvature (Rr) get by the map information getting means 5 is decided, the visible distance of a curved road (Drr) in the curved area being decided from the information as shown in FIG. 10, in order to decide the second running speed (Vt2) in case of a curved road.

Next, the visible distance of a curved road (Drr) is corrected to obtain the value of visible distance (Dv) in accordance with the following equation (3) on the basis of the information data get from FIG. 12 and the Table 1.

$$Dv=Drr \cdot Crw \cdot Cra \tag{3}$$

Reference Cra in the equation (3) is one of the visible correction values of Cra1 to Cra5.

The second running speed (Vt2) is decided on the basis of the information data (running speed (V)) shown in FIG. 9. The second running speed (Vt2) corresponds to the visible distance (Dv) computed by using the equation (3).

The upper limit of the second running speed (Vt2) is the running speed (Vt12) obtained from the equation (1).

The second running speed (Vt2) in case of an ascending or descending road is decided by same deciding method as described above. Namely, the slope visible distance (Drs) is computed on the basis of the information data shown in FIG. 11, the computed slope visible distance being corrected in accordance with the following equation (4), the second running speed (Vt2) being decided on the basis of the information data shown in FIG. 9.

$$Dv = Drs \cdot Crw \cdot Cra \quad (4)$$

The reference Cra in the equation (4) is one of the visible correction values of Cra1 to Cra5. It is a same meaning in case of the equation (3).

A curved area has nearly constant radius of curvature except for easement curves (clothoid curves) formed near the start and end areas of the curved road. Therefore, the visible distance in the curved road (Drr) is nearly constant, the vehicle speed being controlled in accordance with the second running speed (Vt2) and the visible distance (Drr).

Figure 13:
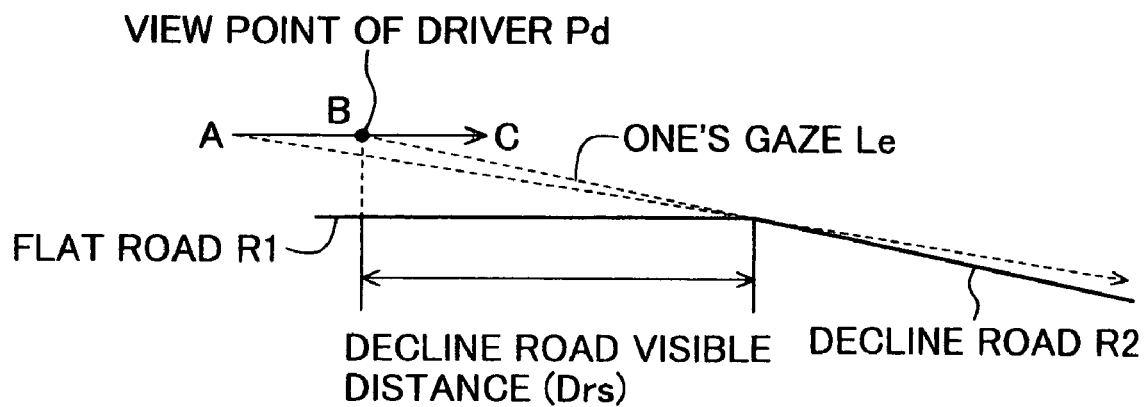
FIG. 13 is an illustration for explaining a visible distance in case of a grade road.

The visible distance of a slope is estimated by using the following logic. The view point Pd of a driver is moved from the points A to B to C with same level from a road surface, when a vehicle runs from a flat road R1 to a descending road R2 connected to the flat road, for example, as shown in FIG. 13.

In this case, the driver cannot view the environment of the front descending road during the running term of the flat road of the point A to B, so that the driver temporarily wishes the running speed lower than the flat road R1 running speed. When the vehicle runs through the point B and the driver can view the environment of the descending road, the vehicle is accelerated and moved into the descending road R2.

Therefore, when a curved road exists in front of own vehicle running road, the second running speed (VT2) is set on the basis of the visible distance (Dv) computed by using the equation (3) until the vehicle runs through the curved road. When a descending road exists in front of own vehicle running road, the second running speed (VT2) is temporarily set on the basis of the visible distance (Dv) computed by using the equation (4) until the view point Pd (shown in FIG. 13) of the driver reaches to the point B.

Figure 14:
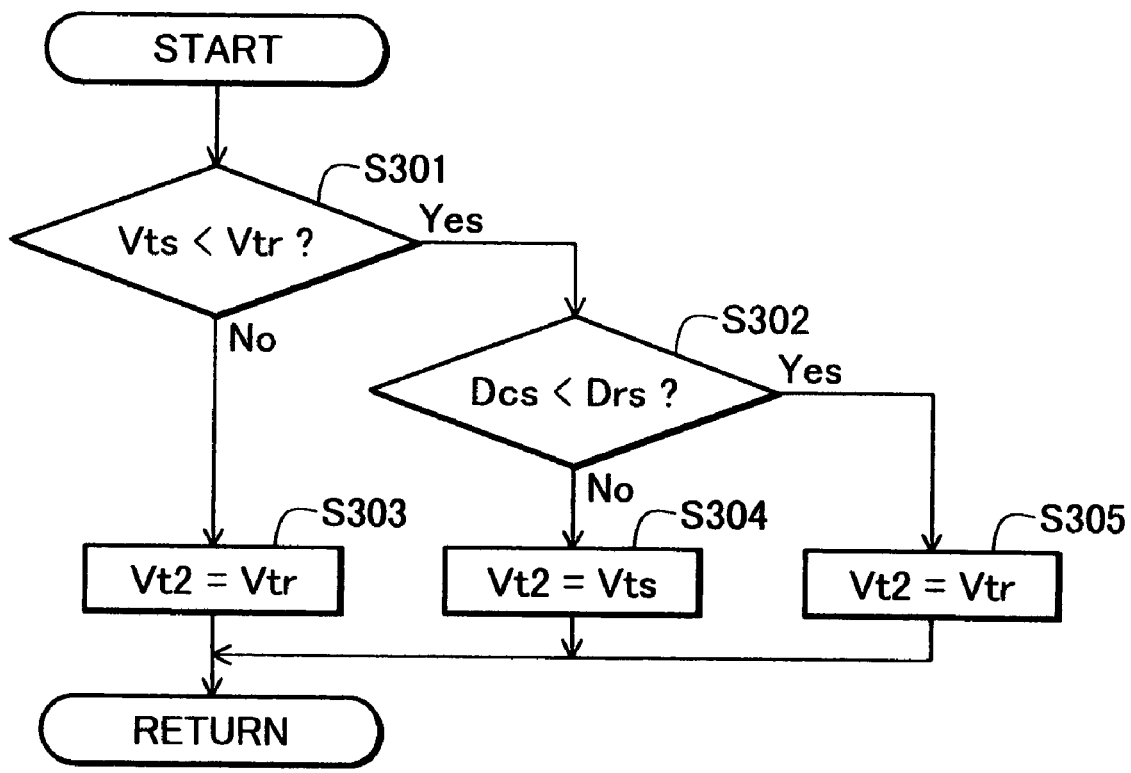
FIG. 14 is a flowchart representing a running speed computation process in case that curve and grade road is in front of one's own vehicle.

The vehicle running speed is controlled in accordance with the operation in the flowchart shown in FIG. 14, when own vehicle will run at a curved road including slope.

Namely, it is judged whether the following equation (5) is satisfied or not at the step S301 shown in FIG. 13 by comparing the running speed (Vts) to the running speed (Vtr). The running speed (Vts) corresponds to the slope visible distance (Drs), the running speed (Vtr) corresponding to the curved road visible distance (Drr).

$$Vts < Vtr \quad (5)$$

When the equation (5) is satisfied at the step S301, the step proceeds the step S302. When the equation (5) is not satisfied at the step S301, the step proceeds the step S303, and the speed Vtr is set the second speed (Vt2), and the process is finished. In the step 302, it is judged whether the view point Pd of a driver reaches to the point B or not. Namely, it is judged whether the distance (Dcs) between own vehicle and the start point of the slope is satisfied to following equation (6).

$$Dcs < Drs \quad (6)$$

When the equation (6) is satisfied at the step S302, the step proceeds the step S305. Subsequently, the speed Vtr is set to the second running speed (Vt2) and the process is finished. When the equation (6) is not satisfied at the step S302, the step proceeds the step S304. Subsequently, the speed Vts is set to the second running speed (Vt2) and the process is finished.

The novel effect of the first embodiment of the present invention is to make the vehicle running speed to match with the feeling of a driver and to supply easiness to a driver.

According to the first embodiment of the present invention, the suitable running speed of a vehicle is set on the basis of the running environment of the curve, slope or the like in front of vehicle running area.

The process using the position of an operating seat in a vehicle will be described hereinafter. The position information of the operating seat (steering wheel is positioned at right side or left side of a vehicle) is used to recognize running environment by the vehicle running control apparatus. The position information of the operating seat is attribute information of a vehicle. The vehicle attribute information is stored in a suitable vehicle attribute information storing means. The map information getting means 5 may be used for the vehicle attribute information storing means.

Figure 15A:
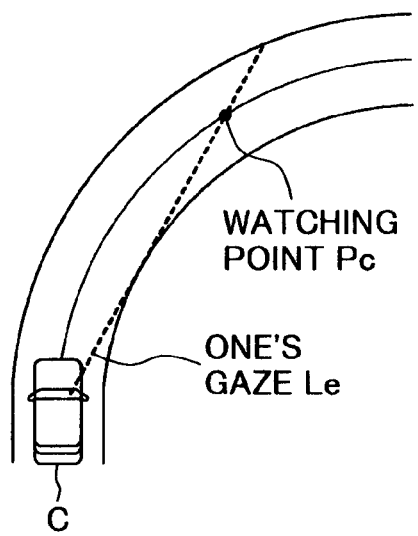
FIGS. 15A and 15B are illustrations for explaining the difference between visible distances of various view points.
Figure 15B:
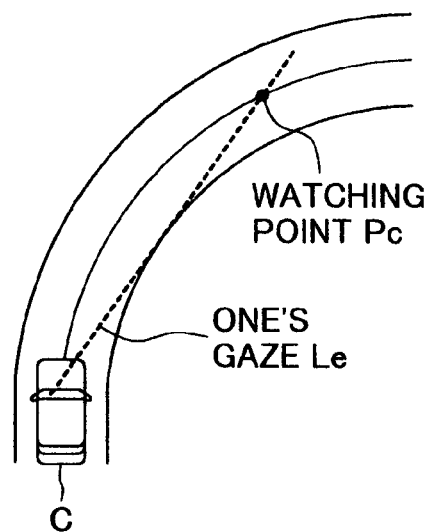

FIGS. 15A and 15B show the difference between the positions of the watching points Pc which are changed by the difference of the position of the operating seat.

In FIGS. 15A and 15B, the watching point Pc is changed in accordance with the position of the operating seat even when a curved road includes same radius of curvature and curving direction. Therefore, the visible distance is changed in accordance with the position of the operating seat.

Namely, as shown in FIG. 15A, when a vehicle having an operating seat at right side runs through a curved road curving in right direction, the visible distance of the vehicle is shorter than that of a vehicle having an operating seat at left side as shown in FIG. 15B.

When a vehicle having an operating seat at left side runs through a curved road curving in left direction, the visible distance of the vehicle is shorter than that of a vehicle having an operating seat at right side (not shown).

Therefore, the data map shown in FIG. 10 is divided into two data map areas of data for curved road curving in the direction of the operating seat side and data for curved road curving in the direction opposite to the operating seat side. One of the data areas is selected whether the operating seat is positioned at right side or left side of the vehicle, so that the accuracy of visible distance (Drr) of a curved road can be improved.

Further, the visible distance is changed in accordance with the height of an operating seat, the height of the operating seat being changed in accordance with the kind of a vehicle. Therefore, the height of an operating seat position of a vehicle or kind of a vehicle may be stored in a storing means.

As described above, the vehicle running control apparatus stores a plurality of data maps, and the visible distance is corrected by selecting and referring a data map suitable for the running environment. Therefore, the control apparatus can precisely control the vehicle speed suitable for running environment, so that amenity and safety can be improved.

Further, the map information getting means 5 may add the information of width of the side band area of the road, the number of lanes, and lane position of own vehicle into the information to be supplied to the running environment recognizing means 7 in order to correct the visible distance. Therefore, the present invention can realize the vehicle running control apparatus wherein amenity and safety can be further improved.

Figure 16A:
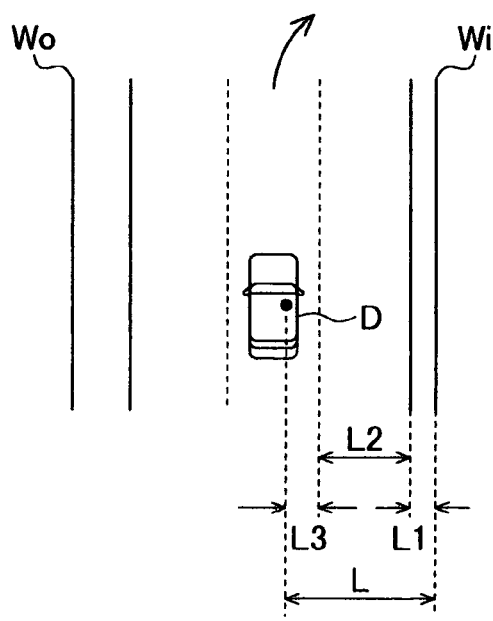
FIGS. 16A and 16B show the distance to a wall surface from the view point of a driver.
Figure 16B:
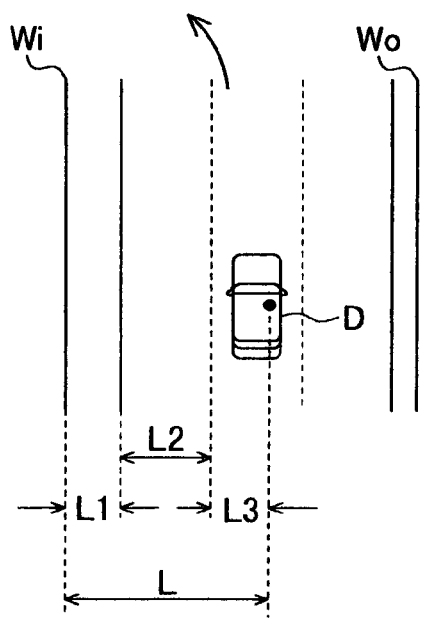

Concretely, as shown in FIGS. 16A and 16B, the visible distance estimating means 6 estimates the distance L between the driver's position and the inner side wall Wi of a curved road, correcting the visible distance (Dv) get by using the data map, deciding the second running speed (Vt2).

In FIGS. 16A and 16B, the operating seat is positioned at the right side of the vehicle. FIG. 16A shows the distance L between the driver and the inner side wall Wi in case of a curved road curving in right direction. FIG. 16B shows the distance L between the driver and the inner side wall Wi in case of a curved road curving in left direction.

In order to decide the second running speed (Vt2), the visible distance is referred from the data map for curved road curving in the driver's side direction in case that the vehicle including the operating seat at right side is being running at the center lane of the right direction curved road having three lanes, as shown in FIG. 16A. The visible distance (Dv) is corrected to decide the second running speed (Vt2) on the basis of the values (L1+L2+L3) of the width (L1) of the right side band area, the width (L2) of the right side lane, and the distance (L3) between the driver's position and the end line of the right side lane.

In case shown in FIG. 16B, the visible distance (Dv) is corrected to decide the second running speed (Vt2) on the basis of the values (L1+L2+L3) of the width (L1) of the left side band area, the width (L2) of the left side lane, and the distance (L3) between the driver's position and the end line of the left side lane.

The storing means stores the widths (L1) of the right and left side band areas, and the widths (L2) of the right and left side lanes as the map information. The driver's position can be estimated from the own vehicle position information.

The visible distance is changed by the existence of side wall and the height of the side wall in case of curved roads having same radius of curvature.

Figure 17:
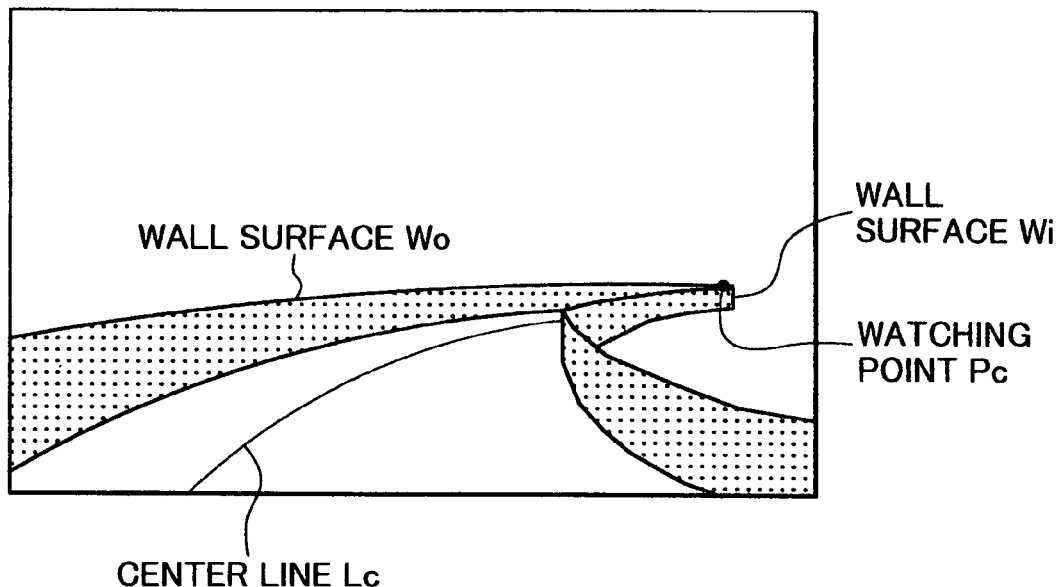
FIG. 17 shows a running environment of a curved road having small radius of curvature and low wall recognized from a driver's view point.

Next, the above-mentioned change of the visible distance will be described hereinafter, FIG. 17 shows a curved road having the same curving direction and radius of curvature as shown in FIG. 4. The side wall shown in FIG. 17 is lower than that of the road shown in FIG. 4.

In one example shown in FIG. 4, the watching point is positioned at Pc because the side wall is higher than the watching point of a driver. In other example shown in FIG. 17, a driver can view through the road because the side wall is lower than the watching point Pc of a driver. The distance between the watching point Pc and the driver shown in FIG. 17 is larger than the distance between the point Pc and the driver shown in FIG. 4.

Therefore, the driver in the environment as shown in FIG. 17 may desire a running speed higher than the running speed in the environment as shown in FIG. 4.

The map information getting means 5 gets the information of existence of a side wall from the map information in order to judge the difference of the visible distance caused by the difference of the heights of side walls. When a side wall exists at the running road, the getting means 5 gets the height of the side wall, deciding the second running speed in accordance with the operation shown in the flowchart in FIG. 18.

Figure 18:
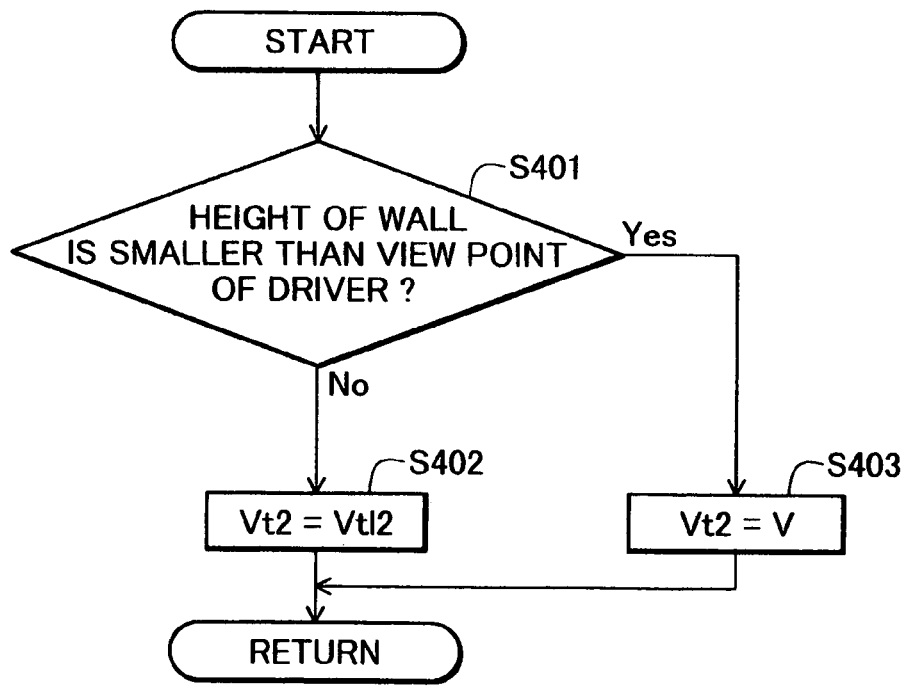
FIG. 18 is a flowchart representing one example of computation of visible distance in case that a wall exists or not.

In the step S401 in FIG. 18, it is judged on the basis of the map information from the map information getting means 5 and vehicle information (kind of vehicle, height of an operating seat or the like) whether the height of the side wall is lower than the driver's watching point or not. If the height of the side wall is not lower than the driver's watching point, the process proceeds to the step S402, and the speed computed by the equation (1) is set to the second running speed (Vt2). Then the process is finished.

According to the above-mentioned process, when the side wall is low and the driver can view through the curved road, the vehicle speed is set to high speed higher than the vehicle speed running at road having high side wall and bad visible. Therefore, the vehicle can be driven with smooth running and no unnecessary braking operation.

Figure 19:
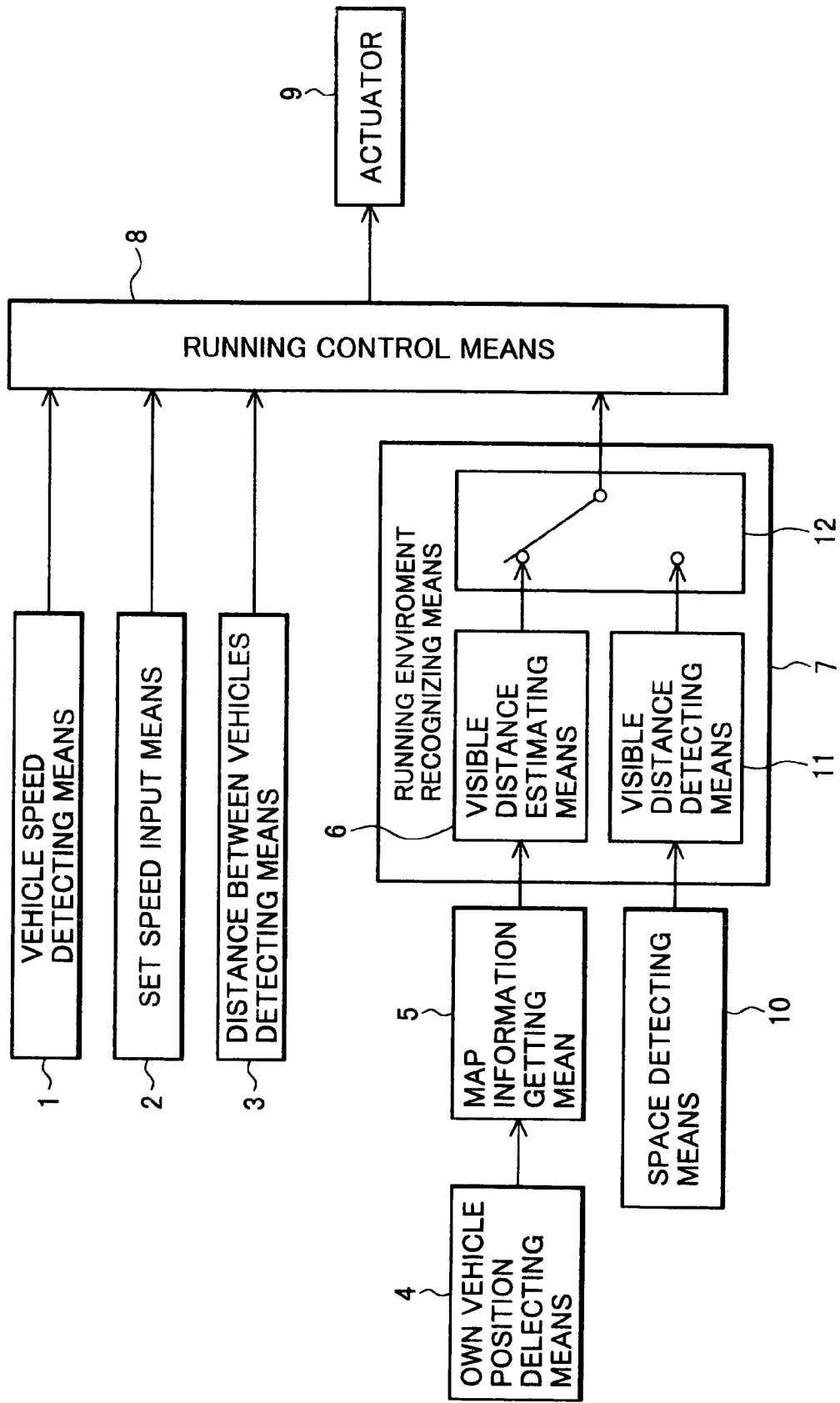
FIG. 19 is a schematic diagram of a vehicle running control apparatus according to the second embodiment of the present invention.

Next, the vehicle running control apparatus according to the second embodiment will be described with reference to FIG. 19 hereinafter.

The vehicle running control apparatus according to the second embodiment includes the construction of the first embodiment. The vehicle running control apparatus according to the second embodiment further includes a space detecting means 10 detecting the vehicle vicinity space, a visible distance detecting means 11 detecting the visible distance on the basis of the output from the space detecting means 10, and an output selecting means 12 selecting the output from the visible distance estimating means 6 or the visible distance detecting means 11. The output selecting means 12 supplies the output signal to the running control apparatus 8.

Figure 20:
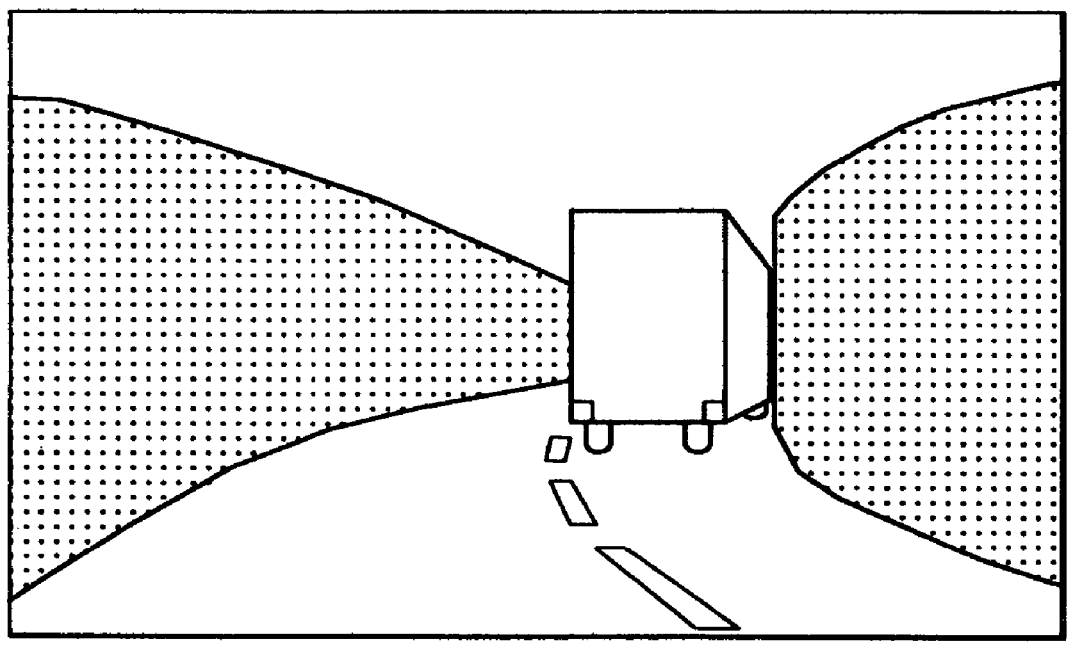
FIG. 20 shows one example of an image from a camera installed in a vehicle.
Figure 21:
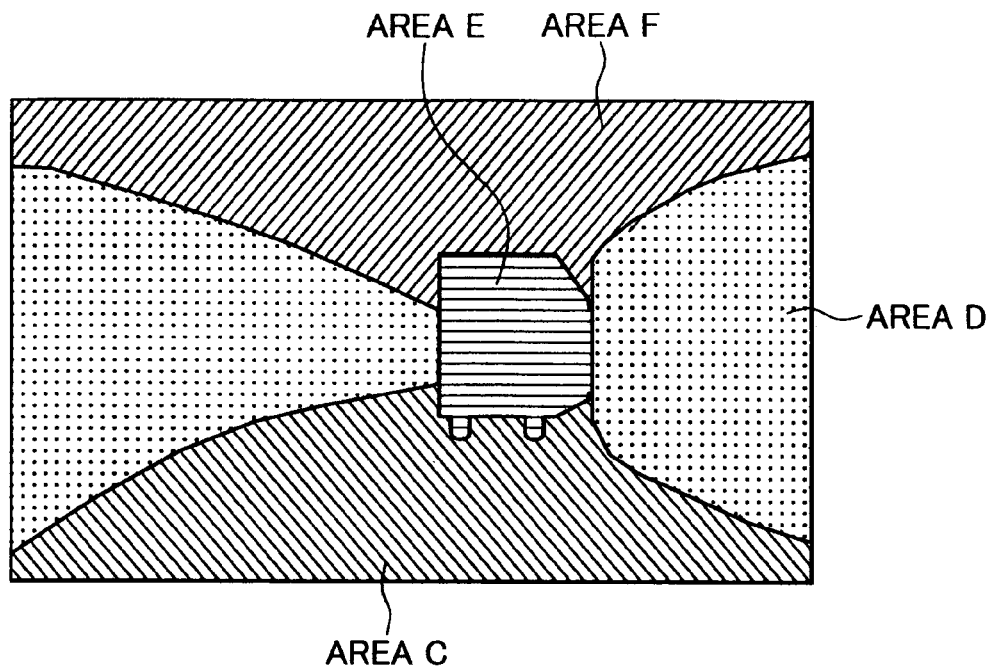
FIG. 21 shows one example of an image processed from the image shown in FIG. 20.

The space detecting means can be realized from a car mounted camera projecting the image in front of the vehicle and an image processing apparatus processing the image projected by the car mounted camera, for example. The space detecting means 10 divides the road image (for example, an image as shown in FIG. 20) obtained by the car mounted camera into 4 areas of the area (C) showing the road, the area (D) of the side area of the driver's field of view, the area (E) on the road in front of the driver's field of view, and the area (F) of the upper area of the driver's field of view, as shown in FIG. 21.

Figure 22:
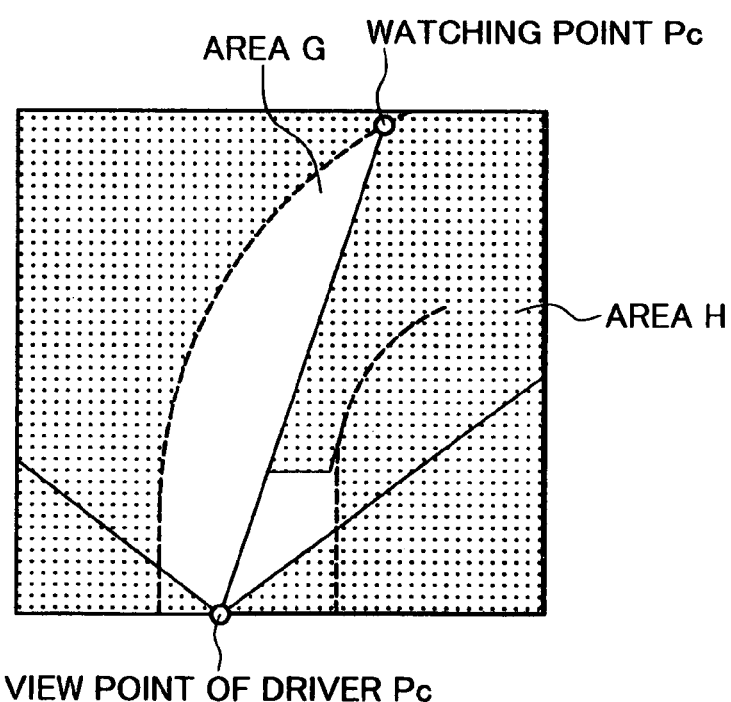
FIG. 22 shows one example a detected space according to the second embodiment of the present invention.

The road environment is divided into the area (G) which can be recognized by the driver, and the area (H) which cannot be recognized by the driver, in order to detect the space in front of the vehicle, as shown in FIG. 22. The area (H) represents the dangerous zone for running the vehicle including moving bodies. The area (G) represents the safety zone.

The visible distance detecting means 11 calculates the watching point Pc from the driver's view point Pd, the visible distance (Dv), and the second running speed (Vt2), as shown in FIG. 22, on the basis of the area information outputted from the space detecting means 10.

The space detecting means 10 may be a distance measuring apparatus such as a laser range finder using reflection electric waves of light or millimeter wave.

If the laser range finder is used as the space detecting means 10, the space information can be detected by scanning laser or the like in 2 or 3 dimensions directions.

If an error exists in a map information obtained from an outer device or stored in the storing means, the error can be corrected by using the space information obtained by the space detecting means.

The output selecting means 12 selects the output from the visible distance estimating means 6 or the visible distance detecting means 11 in response to the output from the own vehicle position detecting means 4.

Next, the function of the output selecting means 12 will be described hereinafter.

The output selecting means 12 selects the output from the visible distance estimating means 6 when own vehicle position detected by the detecting means 4 is apart from a curved road with a predetermined distance. The output selecting means 12 selects the output from the visible distance detecting means 11 when own vehicle position is within the predetermined distance from a curved road.

Therefore, the apparatus computes the second running speed (Vt2) with safety driving on a curved road connected to a straight road on the basis of the output from the map information getting means 5. If the set speed (Vs) is higher than the computed second running speed (Vt2), the speed of the vehicle is controlled to make the speed to the second running speed (Vt2) before own vehicle reaches to the entrance of the curved road. The apparatus can control the running speed of the vehicle by recognizing the environment of the road on the basis of the space detecting means 10 and the visible distance detecting means 11 when the vehicle runs on the curved road.

As described above, according to the second embodiment of the present invention, the apparatus gets the running environment in front of the vehicle from the map information, and the running speed of a vehicle is previously controlled before the vehicle reaches to the detected running environment when the required speed of the vehicle is lower than the speed set by the driver in the vehicle running on the road. The apparatus controls the running speed of the vehicle by recognizing the environment of the road on the basis of the space detecting means 10 and the visible distance detecting means 11 when the vehicle runs on the curved road. Therefore, the apparatus can control the speed of the vehicle in response to the dynamic environment which cannot be obtained from the map information.

Next, the construction of the vehicle running control apparatus according to the third embodiment will be described with reference to FIG. 23.

This third embodiment includes the construction of the second embodiment, further comprising own vehicle position abnormal detecting means 13, a relay 14 turning on/off of the supply of the output signal from the running environment recognizing means 7 to the running control means, and a reporting device 15.

The own vehicle position abnormal detecting means 13 detects the abnormal condition of the own vehicle position detecting means 4 as described below.

The own vehicle position abnormal detecting means 13 stores the output (V1) from the vehicle speed detecting means 1, and the output from the own vehicle position detecting means 4 at the present time. Further, the abnormal detecting means 13 stores the output (V2) from the vehicle speed detecting means 1, and the output from the own vehicle position detecting means 4, after a predetermined time (T) elapsed from the present time. Next, the abnormal detecting means 13 computes the running distance (D1) of the vehicle during a predetermined term T on the basis of the outputs V1 and V2 and term T.

The abnormal detecting means 13 also computes the running distance (D2) during the predetermined term T on the basis of the output from the own vehicle position detecting means 4.

Finally, the abnormal detecting means 13 compares the running distance D1 to the distance D2 in view of the error of the output from the own vehicle position detecting means 4.

If the computed running distance D1 is very large in comparison with the running distance D2 detected by the own vehicle position detecting means 4, it is judged that the output from the detecting means 4 is abnormal condition.

On the other hand, if the computed running distance D1 is larger than or equal to the running distance D2 detected by the own vehicle position detecting means 4, it is judged that the output from the detecting means 4 is normal condition.

The running control apparatus 8 stops all functions or part of functions of the running control, when it is judged on the basis of the output from the own vehicle position abnormal detecting means 13 that the output from the detecting means 4 is abnormal condition. In this case, the reporting device 15 reports the function stop condition to the driver.

Figure 23:
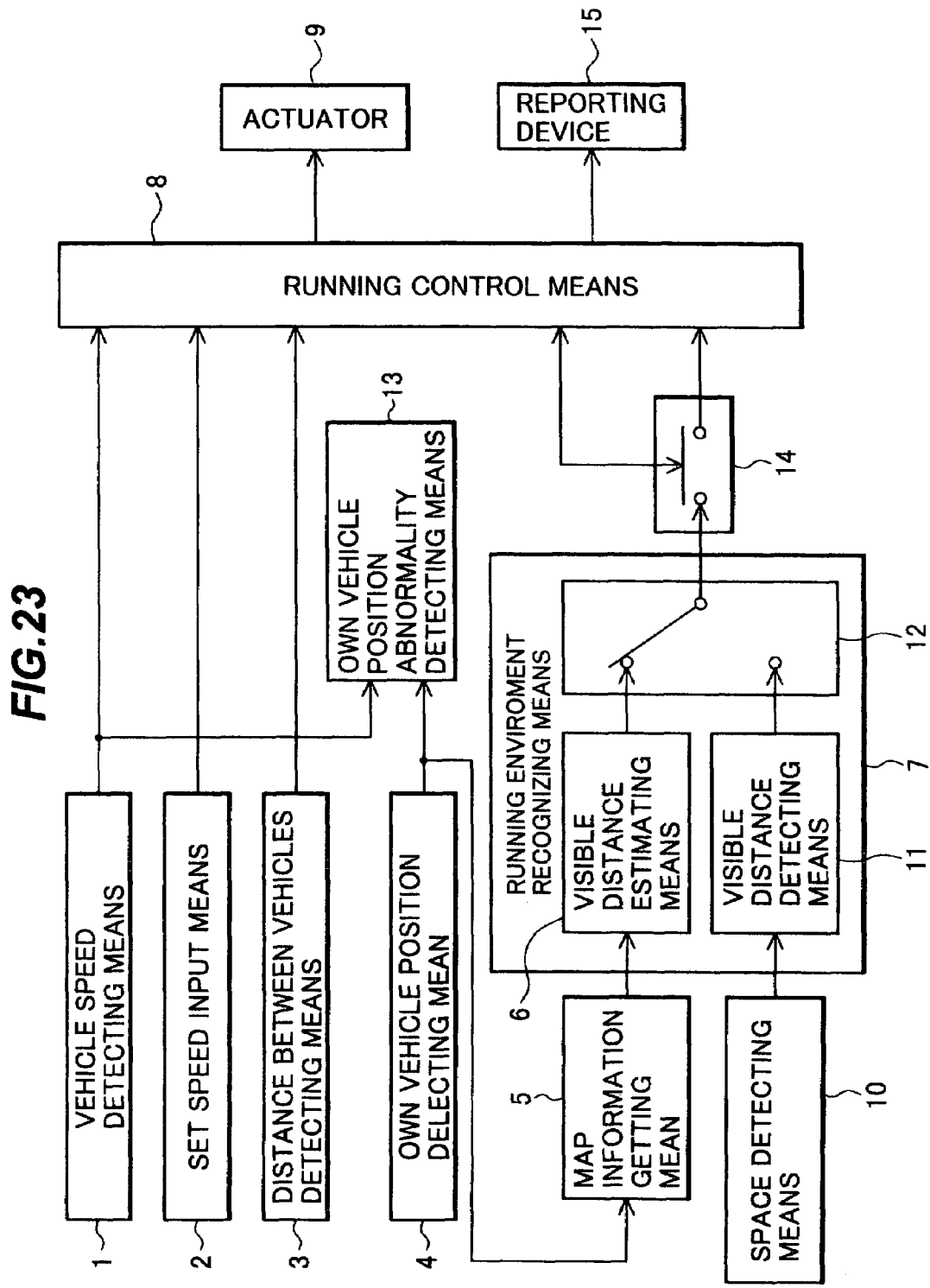
FIG. 23 is a schematic diagram of a vehicle running control apparatus according to the third embodiment of the present invention.

The running control means 8 turns off the relay 14 to prevent the transmission of the output from the recognizing means 7 to the running control means 8 as shown FIG. 23, when the running control apparatus stops a part of it's function. Further, the running control means 8 does not control the actuator 9 when the running control apparatus stops it's all function.

An normal ACC control is executed when the outputting operation of the running environment recognizing means 7 is stopped, for example.

The own vehicle position detecting means 4 does not detect own vehicle position correctly, when the position detected by the detecting means 4 is very different from the position computed from the running distance of the vehicle. In this condition, the vehicle speed is automatically reduced even when the driver does not desire the reduction of the speed. Further, in this condition, the vehicle speed is not reduced even when the driver desires the reduction of the speed.

According to the third embodiment of the present invention, the abnormal detecting means 13 detects the abnormal condition of the own vehicle position detecting means 4, the running control means 8 not controlling the actuator 9 or the like. Therefore, safety and easiness of vehicle driving can be improved.

Next, the map information data base (map information data storing medium) will be described hereinafter.

The information to be stored in the map information data base may include the road attribute information of kinds of road (national high way, automobile road, automobile expressway or the like), and at least one information of the presence of a body on the side of the road, the height of the body on the side of the road, and the width of side band area of the road. The body on the side of the road is a wall, roadside tree or the like, for example.

The information of height of the body may be precise value. Alternatively, the classified information of height of the body may be represented. For example, low, middle, or high information may be represented. The safety and easiness of driving vehicle can be further improved by the third embodiment of the present invention.

It is understood that the present disclosure of the preferred form can be changed in the details of construct ion without departing from the spirit and a scope of the invention.

For example, the relationship between the radius of curvature (Ra) and curved road visible distance (Drr) can be computed without using the data map shown in FIGS. 9 to 12 or Table 1. Further, the relationship between the curved road visible distance (Drr) and the second running speed (Vt2) can be computed without using the data map shown in FIGS. 9 to 12 or Table 1.

One example of computation of the relationship will be described with reference to FIG. 24 hereinafter.

Figure 24:
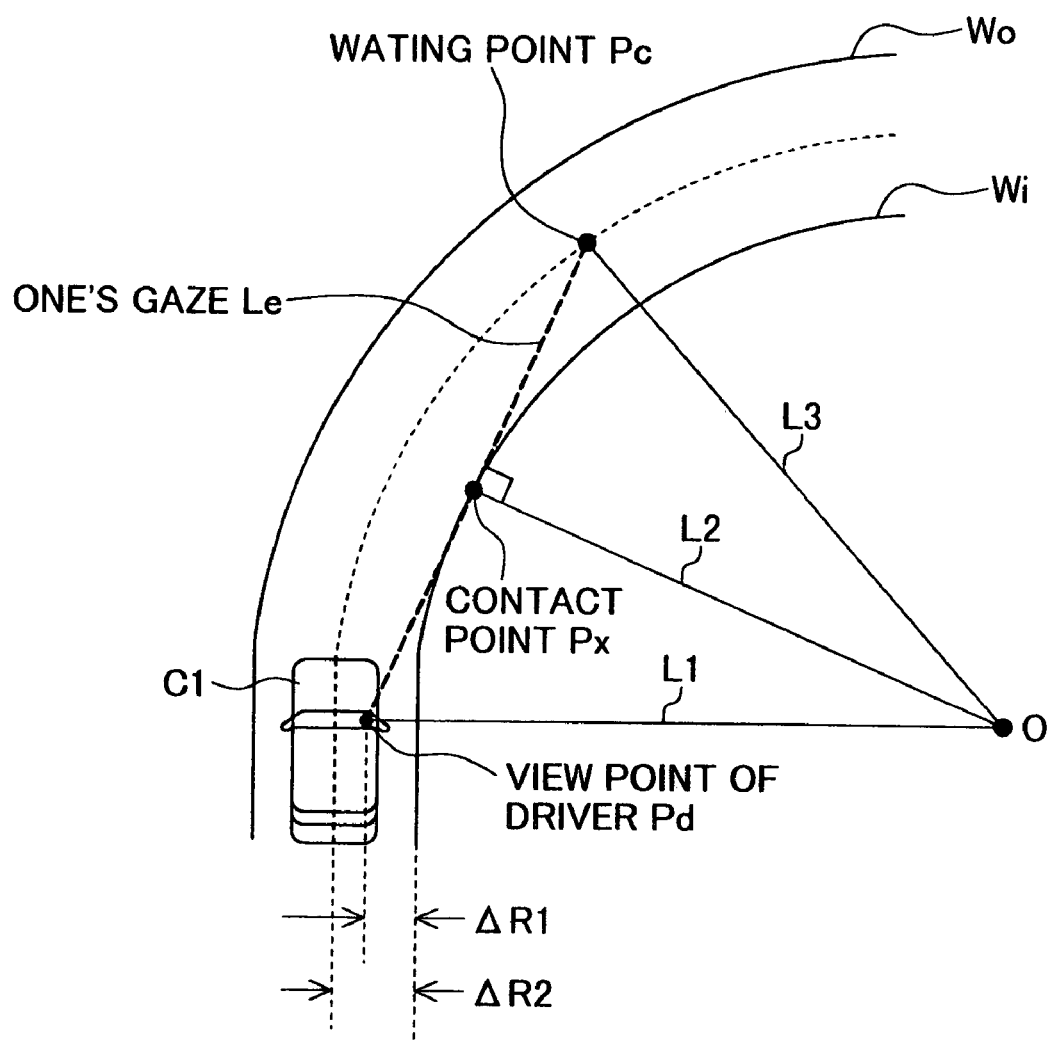
FIG. 24 shows a relationship between a view point of a driver and positions of a curved road.

FIG. 24 is an illustration for explaining the computing method in case that a curved road is regarded as one part of a circle. In FIG. 24, reference C represents an own vehicle, reference Pd representing a view point of a driver, reference Px representing a contact point of an inner side wall Wi and a line Le connecting the view point Pd and the watching point Pc, reference L1 representing a line connecting the view point Pd and the center O of the curved road, reference L2 representing a line connecting the contact point Px and the center O of the curved road, reference L3 representing a line connecting the watching point Pc and the center O of the curved road.

The visible distance (Drr) of the curved road is the distance between the view point Pd and the watching point Pc. The visible distance (Drr) of the curved road is computed by using following equation (7) when the radius of curvature, the distance between the inner side wall Wi and the driver, and the distance between the inner side wall Wi and the watching point Pc are Rr, ΔR1, and ΔR2.

$$Drr=\sqrt{(\Delta R1^2+2\cdot\Delta R1\cdot Rr)}+\sqrt{(\Delta R2^2+2\cdot\Delta R2\cdot Rr)} \quad (7)$$

The visible distance (Drr) obtained from the above equation (7) is a stooped distance (referred as "brake stooped visible distance" hereinafter) required for rapidly braking.

Generally, the brake stooped visible distance is the sum of the free running distance and the brake distance. The free running distance is a vehicle moving distance until the driver judges the dangerous condition from the time point of recognition of the condition. The brake distance is a vehicle moving distance util the vehicle completely stops from the time point of execution of the braking operation by the driver. The running speed (V) of the vehicle is computed by using the following equation (8) in view of the brake stooped visible distance (Drr). The second running speed (Vt2) can be computed on the basis of the computed running speed (V).

$$V=-g\cdot f\cdot T+\sqrt{((g\cdot f\cdot T)^2+2\cdot g\cdot f\cdot Drr)} \quad (8)$$

In the equation (8), reference g represents a gravitational acceleration, reference f representing a coefficient of skid friction in the vehicle running direction (longitudinal coefficient of skid friction) changing in accordance with the condition of the road surface, reference T representing a time (reaction time) required for generating the braking force from the time point of the driver's recognition of the dangerous condition.

As described above, the visible distance (Drr) is estimated by using the equation, the second running speed (Vt2) is computed in view of the friction or the like. Therefore, the effect of the invention can be obtained by using the visible distance (Drr) and the second running speed (Vt2) computed by the equations. In the above-mentioned embodiments, the correction values are decided on the basis of the road attributes as shown in the Table 1, when the visible distance is computed. The correction values may be decided on the basis of the road attributes as shown in the Table 1 and other elements not shown in the Table 1.

For example, the correction values may be changed in view of the weather information obtained from GPS or the like. Further, the age of the driver and driving career of the driver (vehicle attribute information of the origination vehicle) may be previously stored in a storing means, and the correction values may be changed with reference to the stored driver's age or the like.

The vehicle driving operation may be influenced by fog or other gas on a running road. The influence of fog or other gas is not predicted from a weather information.

Therefore, electric wave or the like is radiated from a vehicle, the difference between the intensities of an outgoing wave and receiving wave being computed in order to calculate the influence of the visible distance. The correction values Crw are computed on the basis of the above-mentioned influence, and the visible distance is changed by using the correction values Crw. According to the above-mentioned construction, a vehicle running speed can be controlled suitable for actual running environment.

The fourth embodiment of the present invention is a map information data storing medium storing road construction and attributes.

The map information data storing medium includes at least one information of the presence of a body on a road side, the height of a body on a road side, and the width of the side band area of a road.

Further, the map information data storing medium includes the radius of curvature of a road, the width of a road, and the slope of a road.

The fifth embodiment of the present invention is a vehicle running control system including a vehicle running control apparatus, and a vehicle driving apparatus (actuator) controlled by the vehicle running control apparatus.

Namely, the vehicle running control apparatus in the system includes a set speed input means, an own vehicle position detecting means, a map information getting means getting the information having the road attribute information and road structure information, and a running environment recognizing means having a visible distance estimating means estimating visible distance seen by a driver on a road on the basis of at least one of road attribute, width of a road, radius of curvature, and a slope obtained from the map information. The vehicle running control apparatus further includes a vehicle running control means. The vehicle running control means calculates the running speed in accordance with the visible distance estimated by the running environment recognizing means, comparing the calculated running speed with the set speed set by the speed input means. The vehicle running control means decides the object running speed of the vehicle on the basis of at least one of the calculated running speed and the set speed, controlling the running of the vehicle to keep the object running speed. The vehicle driving apparatus is driven in accordance with the control command from the vehicle running control apparatus to control the speed of the vehicle.

The sixth embodiment of the present invention is an automobile including a vehicle running control apparatus, and a vehicle driving apparatus.

Namely, the automobile includes an automobile running control apparatus automatically controlling an automobile driving without the operation of a driver, and an automobile driving apparatus controlled by the automobile running control apparatus. The vehicle running control apparatus includes a set speed input means, an own automobile position detecting means, a map information getting means getting the information having the road attribute information and road structure information, and a running environment recognizing means having an automobile distance estimating means estimating visible distance seen by a driver on a road on the basis of at least one of road attribute, width of a road, radius of curvature, and a slope obtained from the map information. The automobile running control apparatus further includes an automobile running control means. The automobile running control means calculates the running speed in accordance with the visible distance estimated by the running environment recognizing means, comparing the calculated running speed with the set speed set by the speed input means. The automobile running control means decides the object running speed of the automobile on the basis of at least one of the calculated running speed and the set speed, controlling the running of the automobile to keep the object running speed. The automobile driving apparatus is driven in accordance with the control command from the automobile running control apparatus to control the speed of the vehicle.

According to the present invention, the visible of the road in front of the vehicle is estimated on the basis of the road shape obtained from a detailed map information. Therefore, the speed of the vehicle can be automatically controlled in accordance with the running environment, and the controlled speed coincides with the feeling of a driver even when the vehicle runs on a curved road having bad visible.

Accordingly, the vehicle running control apparatus can be used with safety and no malaise.

Namely, the present invention can realize the vehicle running control apparatus (including an ACC function) wherein effective information for safety driving is obtained to control the running speed coincident with the driver's feeling. Further, the present invention can realize a map information data storing medium used for the vehicle running control apparatus.

What is claimed is:

1. A control apparatus for a vehicle comprising:
   a distance detecting means for detecting a distance between the vehicle and another vehicle;
   a visible distance estimating means for calculating a watching point of a driver on the basis of an input image in front of said vehicle, and estimating a visible distance between said watching point and said vehicle;
   a means for deciding a driving speed of said vehicle on the basis of said visible distance; and
   a vehicle control means for controlling said vehicle to keep said driving speed;
   wherein said visible distance estimating means calculates said watching point on the basis of the input image in front of said vehicle, said watching point being a cross point of a recognition limit line and a center line of a vehicle running lane.

2. A control apparatus according to claim 1, further comprising a camera for obtaining an image data in front of said vehicle,
   wherein said visible distance estimating means divides said image data into a safety area which can be recognized by said driver and a dangerous area which cannot be recognized by said driver, and estimates said visible distance on the basis of said safety area.

3. A control apparatus according to claim 1, further comprising a space detecting means for detecting points which can be recognized by the driver in a running environment, wherein said watching point calculated by said visible distance estimating means is the farthest point from said driver of all the points detected by said space detecting means.

4. A control apparatus according to claim 1, wherein said watching point is calculated on the basis of the input image in front of said vehicle and a distance detected by said distance detecting means.

5. A control apparatus for a vehicle comprising:
   a visible distance estimating means for calculating a watching point of a driver on the basis of a map information including road attributes information and road structure information, and estimating a visible distance between said watching point and said vehicle;
   a means for deciding a driving speed of said vehicle on the basis of said visible distance; and
   a vehicle control means for controlling said vehicle to keep said driving speed;
   wherein said visible distance estimating means calculates said watching point on the basis of said map information, said watching point being a cross point of a recognition limit line and a center line of a vehicle running lane.

* * * * *

UNITED STATES PATENT AND TRADEMARK OFFICE
CERTIFICATE OF CORRECTION

PATENT NO. : 7,684,921 B2  Page 1 of 1
APPLICATION NO. : 10/845137
DATED : March 23, 2010
INVENTOR(S) : Takao Kojima It is certified that error appears in the above-identified patent and that said Letters Patent is hereby corrected as shown below:

Title Pg, Item (75) Inventors: should read as follows:  Takao Kojima, Hitachi (JP); Tokuji Yoshikawa, Hitachi (JP); Kazuhiko Satou, Mito (JP); Satoru Kuragaki, Hitachi (JP); Shiho Izumi, Hitachi (JP); Toshimichi Minowa, Mito (JP)

Signed and Sealed this

Fifteenth Day of June, 2010

David J. Kappos
*Director of the United States Patent and Trademark Office*